United States Patent [19]
Yasuda et al.

[11] Patent Number: 5,949,344
[45] Date of Patent: Sep. 7, 1999

[54] POSITION SENSOR

[75] Inventors: Keiji Yasuda, Handa; Kiyohiro Fukaya, Takahama, both of Japan

[73] Assignee: Aisin Seiki Kabushiki Kaisha, Aichi-pref., Japan

[21] Appl. No.: 09/078,487

[22] Filed: May 14, 1998

[51] Int. Cl.$^6$ .................................................. G08B 21/00
[52] U.S. Cl. ...................... 340/686.3; 33/1 PT; 180/336; 200/179; 340/456; 341/16
[58] Field of Search ................................. 340/686.3, 456; 33/1 PT; 180/336; 341/16; 200/179

[56] References Cited

U.S. PATENT DOCUMENTS 5,561,416  10/1996  Marshall et al. ......................... 340/456

OTHER PUBLICATIONS

"Service Manual for Toyota Crown Hardtop (first volume)", published in Japan on Oct. 11, 1991.

*Primary Examiner*—Glen Swann
*Attorney, Agent, or Firm*—Hazel & Thomas

[57] ABSTRACT

A position sensor including a rotational shaft (7), a plurality of brushes (13, 15, 17, 19) supported by the rotational shaft (7), a housing (3), a printed circuit board (21) fixed to the housing (3), a main conductor (M) provided on the printed circuit board (21) and contacting with the brushes (13, 15, 17, 19) for generating a primary signal in accordance with which a predetermined number of positions has been attained by the rotational shaft (7), and a subordinate conductor (S) provided on the circuit board (21) and contacting with the brushes (13, 15, 17, 19) for generating a secondary signal in accordance with the which a predetermined number of positions has been attained by the rotational shaft (7). The secondary signal keeps the same voltage level around a predetermined position. According to the present invention, the predetermined position of the rotational shaft (7) may be detected accurately. Further, the cost of the position sensor may be reduced.

2 Claims, 4 Drawing Sheets

POSITION SENSOR

This application claims priority under 35 U.S.C. §§119 and/or 365 to "A Position Sensor," the application serial No. H09-141776 filed in Japan on May 30, 1997, the entire content of which is herein incorporated by reference.

BACKGROUND OF THE INVENTION

This invention relates to a position sensor which may be applicable to automobiles, airplanes, vehicles or work machines.

For example, a conventional position sensor is disclosed in SERVICE MANUAL FOR TOYOTA CROWN HARD-TOP (THE FIRST VOLUME) published in Japan on Oct. 11, 1991.

In this manual, a position sensor is connected to a shift lever through a shift cable. The position sensor will generate one detecting signal in accordance with an operational position of the shift lever.

Although the conventional position sensor includes ten electrodes, it may fail easily because such electrodes transmit only one detecting signal to a controller.

For safety, two positional sensors may be used to get two identical detecting signals. However, numbers of electrodes and conductive wires are then doubled. Further, the structure of the position sensor may be too complicated if such position sensors were integrated in one unit. All these issues result in higher weight and higher price of the position sensor.

SUMMARY OF THE INVENTION

One feature of the present invention is to provide a new and improved position sensor.

Further, a feature of the present invention is to detect positions accurately.

Yet further, a feature of the present invention is to provide a low cost position sensor.

Such a position sensor may be described a follows:

A position sensor of the present invention comprising:
a housing;
a moving member supported by the housing;
a stationary member supported by the housing;
a primary detecting member for generating a primary signal in accordance with which a predetermined number of positions has been attained by the moving member with respect to the stationary member; and
a secondary detecting member for generating a secondary signal in accordance with the which a predetermined number of positions has been attained by the moving member with respect to the stationary member, the secondary signal keeping the same value while the moving member is at a certain predetermined position.

The primary signal is generated in accordance with a position of the moving member. In case the primary signal is not accurate due to any malfunction, the secondary signal may be used to detect the position of the moving member.

DETAILED DESCRIPTION OF THE INVENTION

Figure 3:
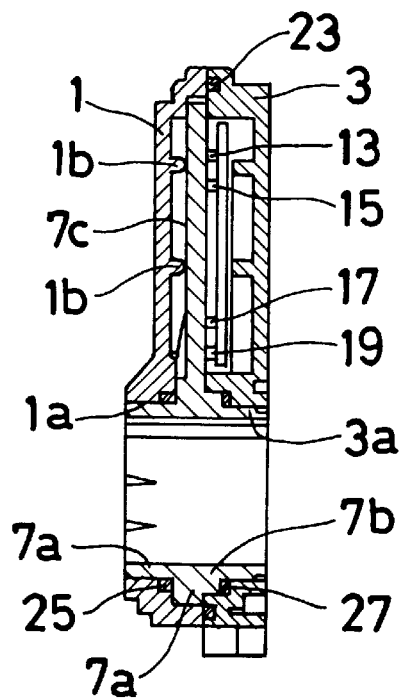
FIG. 3 is a cross sectional view of the position sensor along the line 3—3 shown in FIG. 2.

A plastic cover 1 is fixed to the plastic case 3 by four screws 5. A sealing ring 23 is pinched between the cover 1 and the case 3 for water- and dust-proofing. A rotational shaft 7 comprises a connecting bore 7a, a shaft portion 7b and lever portion 7c. The connecting bore 7a is surrounded by the shaft portion 7b. The lever portion 7c is radially projected from the shaft portion 7b. Any movement of a shift lever (not shown) is transmitted to a shaft (not shown) that is inserted into the bore 7a. As shown in FIG. 3, the cover 1 has an opening 1a. The case 3 has an opening 3a. The rotational shaft 7 is supported by the openings 1a and 3a. Seals 25 and 27 are pinched between the rotational shaft 7 and the openings 1a and 3a. The seals 25 and 27 are for water- and dust-proofing. One surface of the lever portion 7c contacts with two projected lines 1b for supports. The rotational shaft 7 will be rotated around an axis of the connecting bore 7a when the shaft (not shown) is rotated by the shift lever (not shown).

Figure 4:
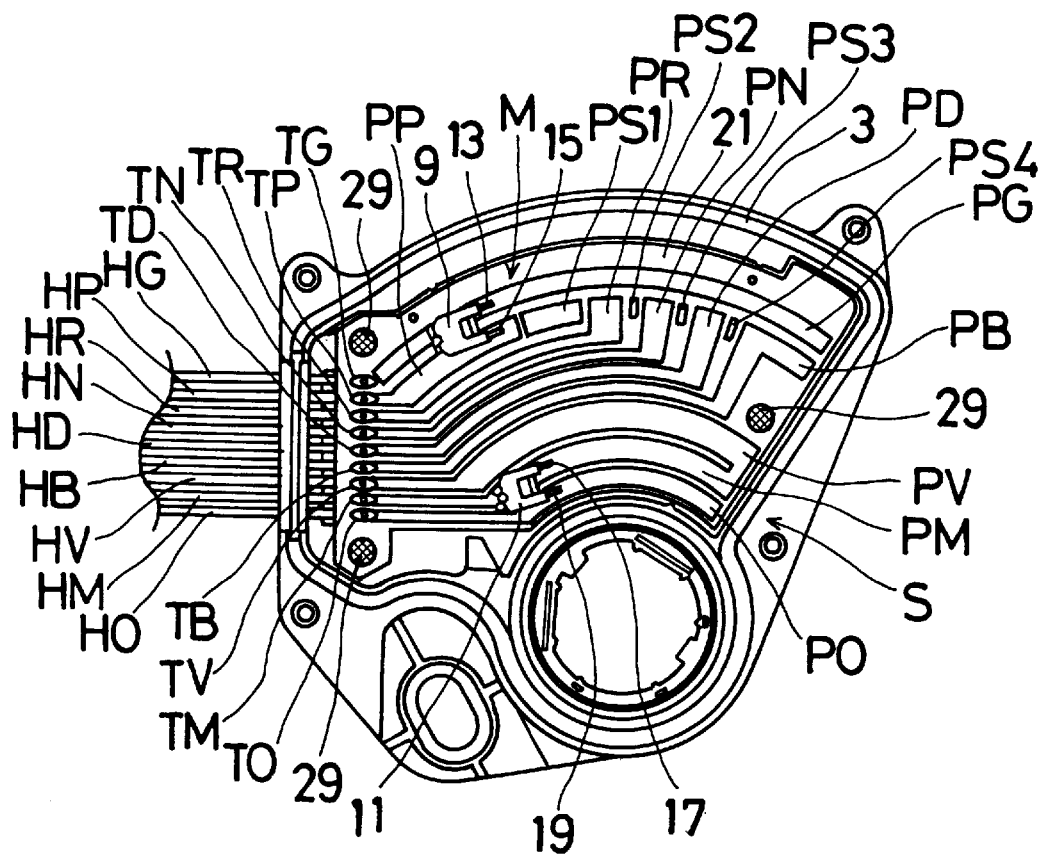
FIG. 4 is a plan view of the position sensor without a cover and a rotational shaft.

As shown in FIG. 4, a first brush holder 9 and a second brush holder 11 is fixed to the lever portion 7c by heat caulking or ultrasonic caulking. A space is maintained between the first and the second holders 9 and 11. The first brush holder 9 supports a first brush 13 and a second brush 15. The second brush holder 11 supports a third brush 17 and a fourth brush 19. The first brush 13 is electrically connected to the second brush 15 through the brush holder 9. The third brush 17 is electrically connected to the fourth brush 19 through the second brush holder 11.

Figure 8:
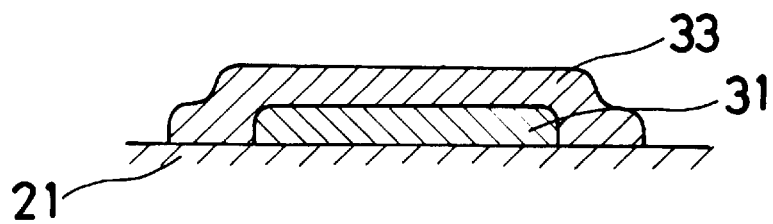
FIG. 8 is a cross sectional view of the main conductor.

A circuit board 21 is fixed to the case 3 by three ultrasonic caulking points 29. On the circuit board 21, a main conductor M and subordinate conductor S are formed. The main conductor M comprises six conductive patterns PG, PP, PR, PN, PD and PB. The subordinate conductor S comprises three conductive patterns PV, PM and PO. As shown in FIG. 8, each conductive pattern of the main conductor M comprises a low resistance conductor 31 formed on the circuit board 21, and a relatively high resistance conductor 33 provided on the low resistance conductor 31. The relatively high resistance conductor 33 covers the low resistance conductor 33 to protect the low resistance conductor 33 from wearing. The low resistance conductor may be a copper film. The relatively high resistance conductor 33 may be a printed carbon phenol.

Conductive patterns PG, PP, PR, PN, PD, PB, PV, PM and PO are soldered to power and communication cables HG, HR, HN, HD, HB, HV, HM and HO at terminals TG, TP, TR, TN, TD, TB, TV, TM and TO.

The conductive pattern PG is connected to a grounded terminal of a controller (not shown) through the power cable HG. The other conductive patterns PP, PR, PN, PD and PB of the main conductor M are connected to the controller (not shown) through the commutation cables HP, HR, HN, HD and HB. Each communication cable HP, HR, HN, HD and HB is connected to a battery (not shown) through a clump resistor (not shown) for noise reduction. The battery (not shown) generates a voltage Vcc.

The conductive pattern PV is connected to a power terminal of the controller (not shown) through the power cable HV. The conductive pattern PM is connected to the grounded terminal of the controller (not shown) through the power cable HM. The conductive pattern PO is connected to the controller (not shown) through the communication cable HO.

The first brush 13 always contacts with the conductive pattern PG of the main conductor M. The second brush 15 will contact one of the conductive patterns PP, PR, PN, PD and PB depending on a position of the first brush holder 19 that is changed by rotation of the rotational shaft 7. Patterns PS1, PS2, PS3 and PS4 are formed on the circuit board 21. These patterns PS1, PS2, PS3 and PS4 will prevent the second brush 15 from wearing due to slippage between the second brush 15 and the circuit board 21.

The third brush 17 and the fourth brush 19 contact with the conductive patterns PM and PO of the subordinate pattern S during rotation of the rotational shaft 7.

Figure 5:
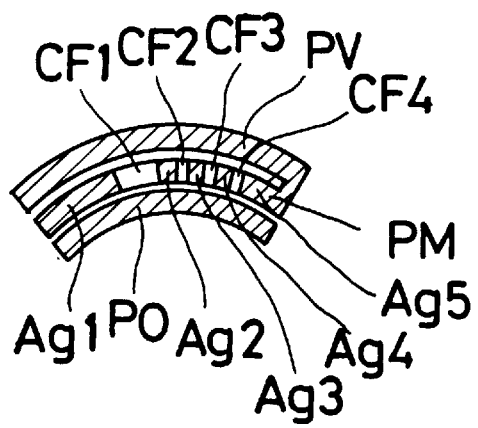
FIG. 5 is a detailed view of the main conductor.

As shown in FIG. 5, a low resistant material, such as silver, is printed over the conductive patterns PV and PO. The conductive pattern PM includes low resistant portions Ag1, Ag2, Ag3, Ag4, Ag5 and high resistant portions CF1, CF2, CF3 and CF4. The low resistant portions Ag1, Ag2, Ag3, Ag4, Ag5 may be formed by silver. The high resistant portions CF1, CF2, CF3 and CF4 may be formed by carbon phenol that has a relatively high electric resistance. The high resistant portion CF1 is formed between the low resistant portions Ag1 and Ag2. The high resistant portion CF2 is formed between the low resistant portions Ag2 and Ag3. The high resistant portion CF3 is formed between the low resistant portions Ag3 and Ag4. The high resistant portion CF4 is formed between the low resistant portions Ag4 and Ag5. The conductive patterns PV, PO and the low resistant portions Ag1, Ag2, Ag3, Ag4, Ag5 are further covered by carbon phenol to prevent them (PV, PO, Ag1, Ag2, Ag3, Ag4 and Ag5) from wearing due to slippage with respect to the brushes 13 and 15.

Figure 6:
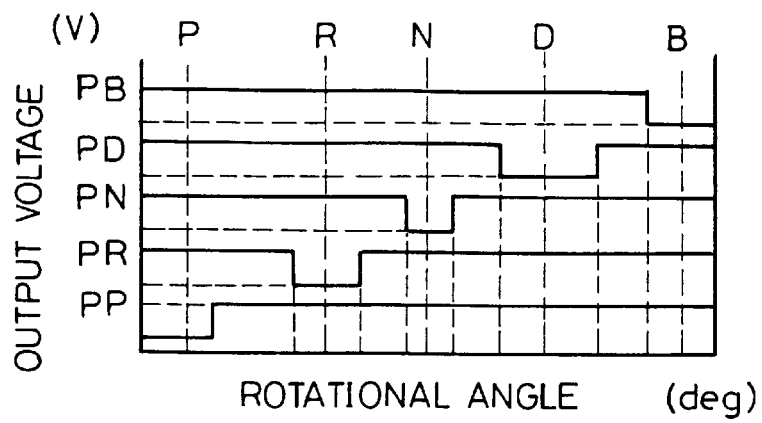
FIG. 6 is an output signal chart of the main conductor.
Figure 7:
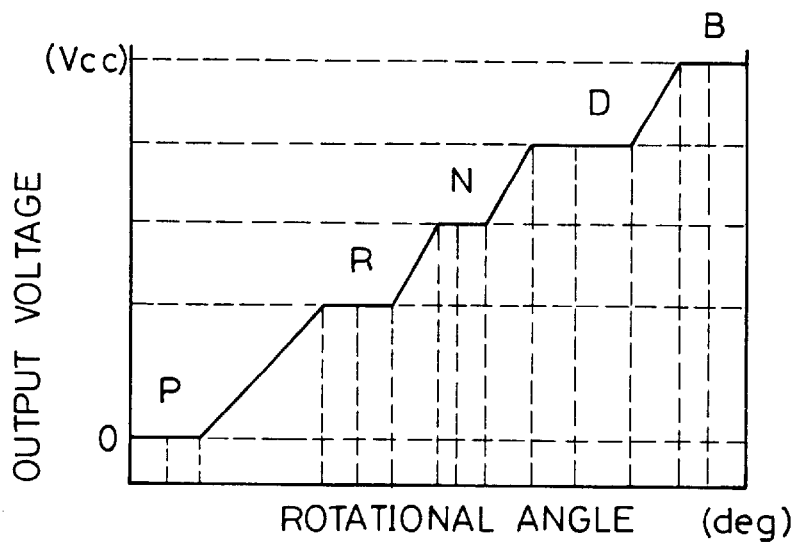
FIG. 7 is an output signal chart of the subordinate conductor.

Referring now to FIGS. 6 and 7, an operation of the preferred embodiment will be explained. When the shift lever (not shown) is at the parking position P to park the automobile, the second brush 15 is on the conductive pattern PP to connect the conductive pattern PP to the conductive pattern PG through the first brush holder 9. Upon this time, the conductive pattern PP is grounded and transmits the ON signal (e.g., a low voltage signal) to the controller (not shown). The other conductive patterns PR, PN, PD and PB transmit the OFF signal (e.g., a high voltage signal Vcc) to the controller (not shown).

Figure 1:
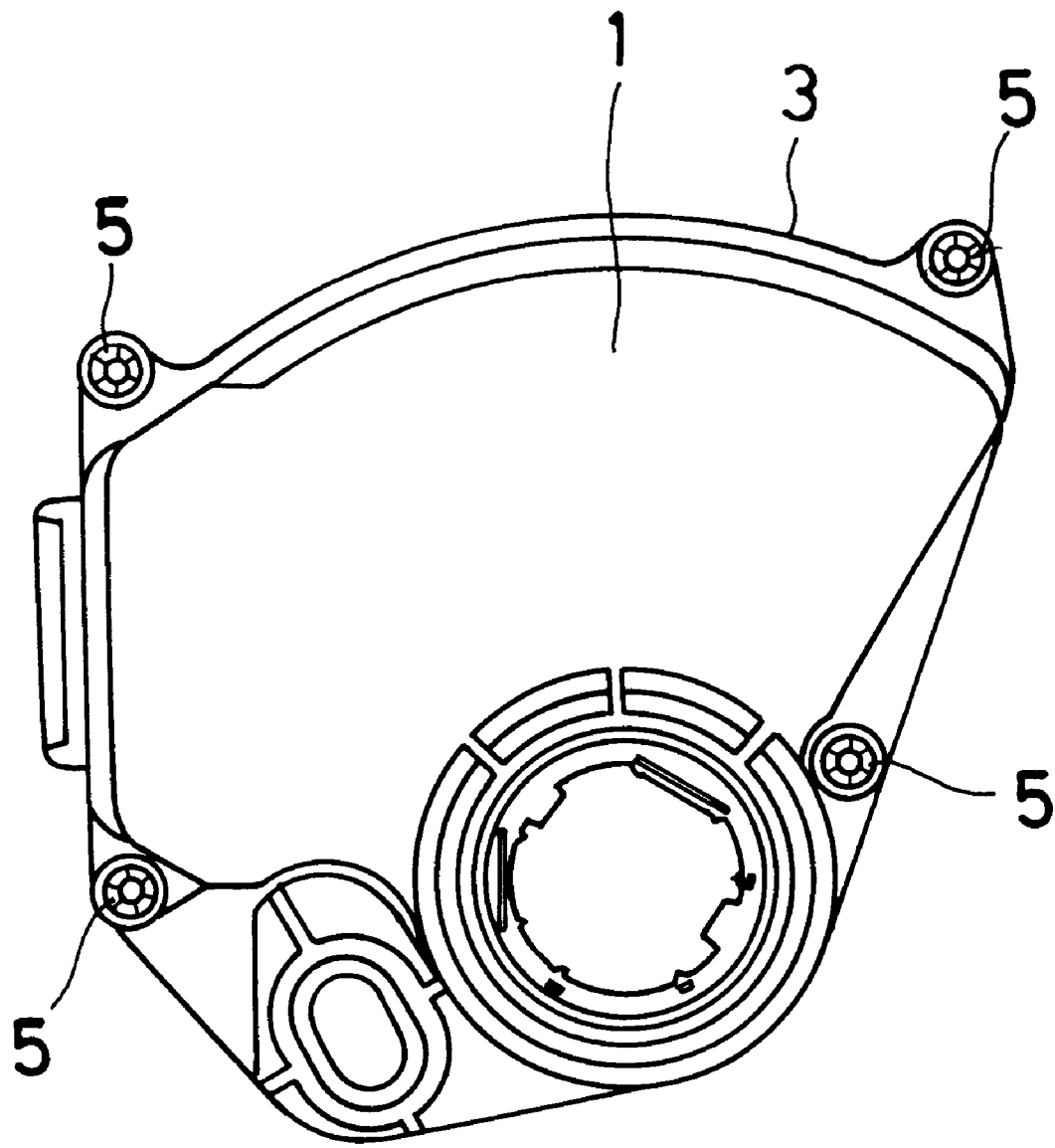
FIG. 1 shows a plan view of a position sensor for the shift lever of an automobile automatic transmission.
Figure 2:
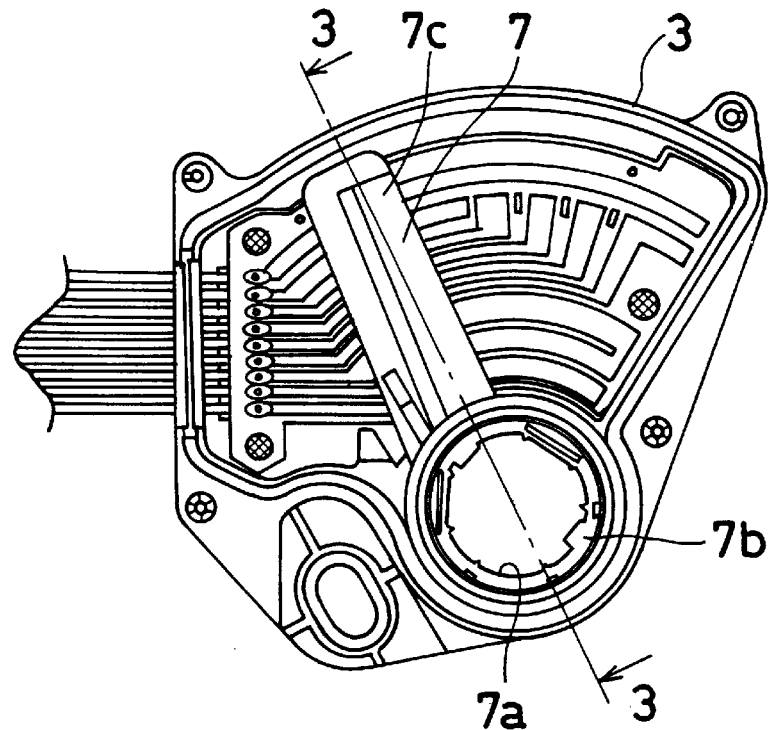
FIG. 2 is a plan view of the position sensor without a cover.

When the shift lever (not shown) is at the reverse position R to drive the automobile backward, the rotational shaft will be rotated clockwise in FIG. 2 to put the second brush 15 on the conductive pattern PR. Accordingly, the conductive pattern PG is connected to the conductive pattern PR through the first brush holder 9. In other words, the conductive pattern PR is grounded and transmits the ON signal (e.g., a low voltage signal) to the controller (not shown). The other conductive patterns PP, PN, PD and PB transmit the OFF signal (e.g., a high voltage signal Vcc) to the controller (not shown)

When the shift lever (not shown) is at the parking position P to park the automobile, the third brush 17 is on the resistant portion Ag1 of the conductive pattern PM so that the second brush holder 11 connects the resistant portion Ag1 to the conductive pattern PO. The conductive pattern PO will transmit the zero volt signal to the controller (not shown) since the conductive pattern PM is grounded to the grounded terminal of the controller (not shown) and an electric resistance of the resistant portion Ag1 is low enough.

When the shift lever (not shown) is at the reverse position R to drive automobile backward, the third brush 17 is on the resistant portion Ag2. A voltage at the resistant portion Ag2 is determined by the battery voltage Vcc and resistant ratio of resistant portions CF1, CF2, CF3 and CF4.

The voltage at portion $Ag2 = Vcc \cdot R1/(R1+R2+R3+R4)$ wherein R1, R2, R3 and R4 are electric resistances of resistant portions CF1, CF2, CF3 and CF4.

Accordingly, as shown in FIG. 7, the conductive pattern PO transmits to the controller (not shown) a higher voltage than that of the parking position P. FIG. 7 shows an output voltage characteristic at respective positions P, R, N, D and B of the shift lever (not shown). An inclined line between positions P and R shows an intermediate signal while the third brush 17 is at the resistant portion CF1. An inclined line between positions R and N shows an intermediate signal while the third brush 17 is at the resistant portion CF2. An inclined line between positions N and D shows an intermediate signal while the third brush 17 is at the resistant portion CF3. An inclined line between positions D and B shows an intermediate signal while the third brush 17 is at the resistant portion CF4.

For example, both the conductive patterns PP and PD of the main conductor M may transmit the ON signals (e. g., low voltage signals) to the controller (not shown) due to an undesirable article put on the circuit board 21, even while the shift lever (not shown) is at the parking position P. In this case, however, the controller (not shown) will detect such malfunction of the main conductor M so as to judge the parking position P of the shift lever (not shown) based upon the zero volt signal received from the conductive pattern PO of the subordinate conductor S.

It is possible to modify the main conductor M to generate the step up signal similar to that of the subordinate conductor S.

As explained above, the position sensor of this invention has two sets of the signal lines with only three additional conductive patterns PV, PM, PO and terminals TV, TM, TO. Further, a position of the shift lever (not shown) may be accurately detected against some angular error of the rotational shaft 7 with respect to the circuit board 21 since the subordinate conductor S will generate the step up signal that keeps the same voltage levels around respective positions P, R, N, D and B.

What is claimed is:

1. A position sensor comprising:

a housing;

a moving member supported by the housing;

a stationary member supported by the housing;

a primary detecting member for generating a primary signal in accordance with which of a predetermined number of positions the moving member has attained with respect to the stationary member; and a secondary detecting member for generating a secondary signal in accordance with which of the predetermined positions the moving member has attained with respect to the stationary member, the secondary signal keeping the same value while the moving member is around a given predetermined positions;

wherein the primary detecting member generates a binary signal and the secondary detecting member generates an analog signal which is intermediate between the predetermined positions.

2. A position sensor according to claim 1 wherein the secondary detecting member further comprises:

low resistant portions corresponding to the predetermined positions; and high resistant portions between the low resistant portions.

* * * * *